United States Patent
Andres et al.

(10) Patent No.: US 9,135,035 B2
(45) Date of Patent: Sep. 15, 2015

(54) MARKUP LANGUAGE INTEGRATION AT RUNTIME

(71) Applicant: Oracle International Corporation, Redwood City, CA (US)

(72) Inventors: Ariel Morelli Andres, Ciudad de Buenos Aires (AR); Ezequiel Mauro Bergamaschi, Ciudad de Buenos Aires (AR); Paulo Gustavo Veiga, San Martin (AR); Gustavo Battistoni, Olivos (AR)

(73) Assignee: Oracle International Corporation, Redwood City, CA (US)

( * ) Notice: Subject to any disclaimer, the term of this patent is extended or adjusted under 35 U.S.C. 154(b) by 195 days.

(21) Appl. No.: 13/896,964

(22) Filed: May 17, 2013

(65) Prior Publication Data

US 2014/0344781 A1    Nov. 20, 2014

(51) Int. Cl.
  *G06F 9/44*    (2006.01)
  *G06F 9/45*    (2006.01)
  *G06F 9/455*   (2006.01)

(52) U.S. Cl.
  CPC ................................ *G06F 9/45508* (2013.01)

(58) Field of Classification Search
  None
  See application file for complete search history.

(56) References Cited

U.S. PATENT DOCUMENTS

| | | | | |
|---|---|---|---|---|
| 7,152,090 | B2 * | 12/2006 | Amirisetty et al. | 709/200 |
| 8,069,435 | B1 * | 11/2011 | Lai | 717/106 |
| 2005/0257193 | A1 * | 11/2005 | Falk et al. | 717/109 |
| 2006/0048097 | A1 * | 3/2006 | Doshi | 717/120 |
| 2006/0123390 | A1 * | 6/2006 | Chan et al. | 717/115 |
| 2013/0074052 | A1 | 3/2013 | Adams et al. | |
| 2013/0104100 | A1 | 4/2013 | Mueller | |

OTHER PUBLICATIONS

The Java™ Architecture for XML Binding (JAXB) 2.0, Final Release Apr. 19, 2006, Editors: Sekhar Vajjhala, Joe Fialli, Sun Microsystems, Inc., pp. 1-384.
Groovy User Guide, http://groovy.codehaus.org/User+Guide, Downloaded May 16, 2013, pp. 1-6
Groovy as script, http://groovy.codehaus.org/Groovy+as+script, Downloaded May 16, 2013, pp. 1-4.
Groovy Scripts and Classes, http://groovy.codehaus.org/Scripts+and+Classes, downloaded May 16, 2013, pp. 1-3.

(Continued)

*Primary Examiner* — Insun Kang
(74) *Attorney, Agent, or Firm* — Robert C. Kowert; Meyertons, Hood, Kivlin, Kowert & Goetzel, P.C.

(57) ABSTRACT

Methods and apparatus for marshalling markup language objects into programming language objects in a scripting language runtime environment. A markup language integration method may be implemented in scripting runtime environments that allows the use of simple and complex markup language structures in scripts. At runtime of a script, only classes for the schema structures that are referenced by the script are generated. Document Object Model (DOM) objects may be incrementally constructed according to the schema structures referenced by the script, and bytecode may be generated corresponding to the schema structures according to class metadata for the schema structures. The bytecode may be dynamically linked in the runtime environment. The classes defined by the schema act as wrappers for the DOM objects; when an object is updated by the script, a corresponding DOM object is also updated. Type checking may be applied to catch script errors during development.

20 Claims, 8 Drawing Sheets

(56) References Cited

OTHER PUBLICATIONS

Getting Groovy with XML, https://today.java.net/pub/a/today/2004/08/12/groovyxml.html, Published Aug. 12, 2004, Jack Herrington, pp. 1-10.

Oracle®Fusion Middleware—Business Process Composer User's Guide for Oracle Business Process Management Apr. 2011, pp. 1-186.

* cited by examiner

MARKUP LANGUAGE INTEGRATION AT RUNTIME

BACKGROUND

Scripting languages are programming languages that are interpreted at runtime rather than being precompiled as in compiled programming languages. For example, there are several conventional scripting languages for Java® technology environments, for example the Java® Runtime Environment (JRE®) in Java® Virtual Machine (JVM®) technology. Some examples of scripting languages for Java® technology (e.g., JVM®) environments include Groovy, Jruby, Scala, Fantom, and Jython (Python for JVM®). When executing scripts in a scripting language, there is often a need to bind markup language structures (e.g., Extensible Markup Language (XML) schema structures) to the programming language (e.g., the Java® programming language). Scripting languages may be used to develop scripting applications or scripting modules within applications.

While there are many conventional data binding frameworks for binding Extensible Markup Language (XML) structures to the Java® language (JiBX, Castor XML, JBind, XMLBeans and Java Architecture for XML Binding (JAXB®), among others), JAXB is generally considered the de facto Java® technology for binding XML structures to Java® classes. Generally, these conventional data binding frameworks operate by generating Java® classes from XML schema structures; the Java® classes are then compiled to generate Java® types that represents the schema structures. Typically, using these conventional data binding frameworks, Java® classes are generated for all the XML schema structures in a set of XML Schema Definition (XSD) files, even for XML schema structures that are not used in the code that is being compiled or script that is being interpreted. For example, in scripting languages, the XML schema structures needed by a script to be executed would generally be precompiled along with all other XML schema structures defined in a set of XSD files using a data binding framework (e.g., JAXB) prior to executing the script. This need to precompile the XML schema prior to executing a script may be an issue, particularly in design and development environments where the XML schema structures and the scripts may frequently be modified. Recompiling the entire XML schema every time the developer modifies the XML schema or the script can be very time consuming.

In addition, these data binding frameworks do not allow the manipulation of parsed Document Object Model (DOM) structures. For example, JAXB builds the object structure by parsing XML. JAXB does not transform directly from a DOM structure to the JAXB model, and thus cannot build the object tree directly from a parsed DOM structure. If a DOM structure is available, the DOM structure must be serialized (or marshaled) to generate XML, and then the XML is deserialized (or unmarshaled) to the JAXB model. This need for serialization and deserialization can also be very time consuming, especially in projects with large XML schemas.

Java, JRE, JVM, and JAXB are trademarks or registered trademarks of Oracle, Inc. and/or its affiliates in the United States and other countries.

SUMMARY

Embodiments of methods and apparatus for marshalling markup language (e.g., Extensible Markup Language (XML)) objects into object-oriented programming language (e.g., Java® technology programming language) objects when executing scripts in a scripting language runtime environment are described. Embodiments of a markup language integration method that may be implemented by scripting runtime engines in scripting runtime environments are described that allow the use of simple and complex markup language (e.g., XML schema) structures in scripts. In at least some embodiments of a scripting runtime engine, XML Schema Definition (XSD) elements and types are made accessible in scripting applications or scripting modules within applications. Via a scripting interface, users (e.g., developers, programmers, or other script users) may include and manipulate XML schema structures in scripts.

In at least some embodiments, Java technology bytecode may be generated corresponding to the XML schema structure(s), for example from class metadata (e.g., class definitions) generated from the XML schema structure(s). The Java® bytecode may then be dynamically linked in the runtime environment (e.g., Java® Virtual Machine (JVM®) technology runtime environment).

In at least some embodiments, during runtime of a script, Document Object Model (DOM) objects may be incrementally constructed by the scripting runtime engine according to the XML schema structure(s) referenced by the script. The XML classes defined by the structures in the schema act as wrappers for the DOM structures; every time a field of a class object defined by an XML schema structure is updated by the script, the corresponding DOM structure is also updated.

In at least some embodiments, XML type descriptions are made available in the scripting runtime environment, and thus type checking may be applied to script instructions referencing the XML schema structures to catch scripting errors during development.

Embodiments of the scripting runtime engine generate object-oriented programming language (e.g., Java®) classes on demand in a type safe way, only generating classes for those markup language (e.g., XML) schema structures that are referenced by the script. In addition, embodiments may wrap object model (e.g., DOM) objects in markup language (e.g., XML) classes defined by the structures in the schema, thus not requiring serialization and deserialization of the markup language structures to generate the object model structures. Using embodiments of the scripting runtime engine, script developers may reference and modify markup language (e.g., XML) structures via a script while having a strong type checking mechanism to prevent coding errors. A developer may modify the markup language (e.g., XML) schema structures referenced by a script, and the script can be executed without requiring the recompilation of the entire schema as object-oriented programming language (e.g., Java®) classes are generated for only the schema structures referenced by the script, thus saving time. In addition, object model (e.g., DOM) objects are directly generated for the developer in a type safe way.

Figure 1:
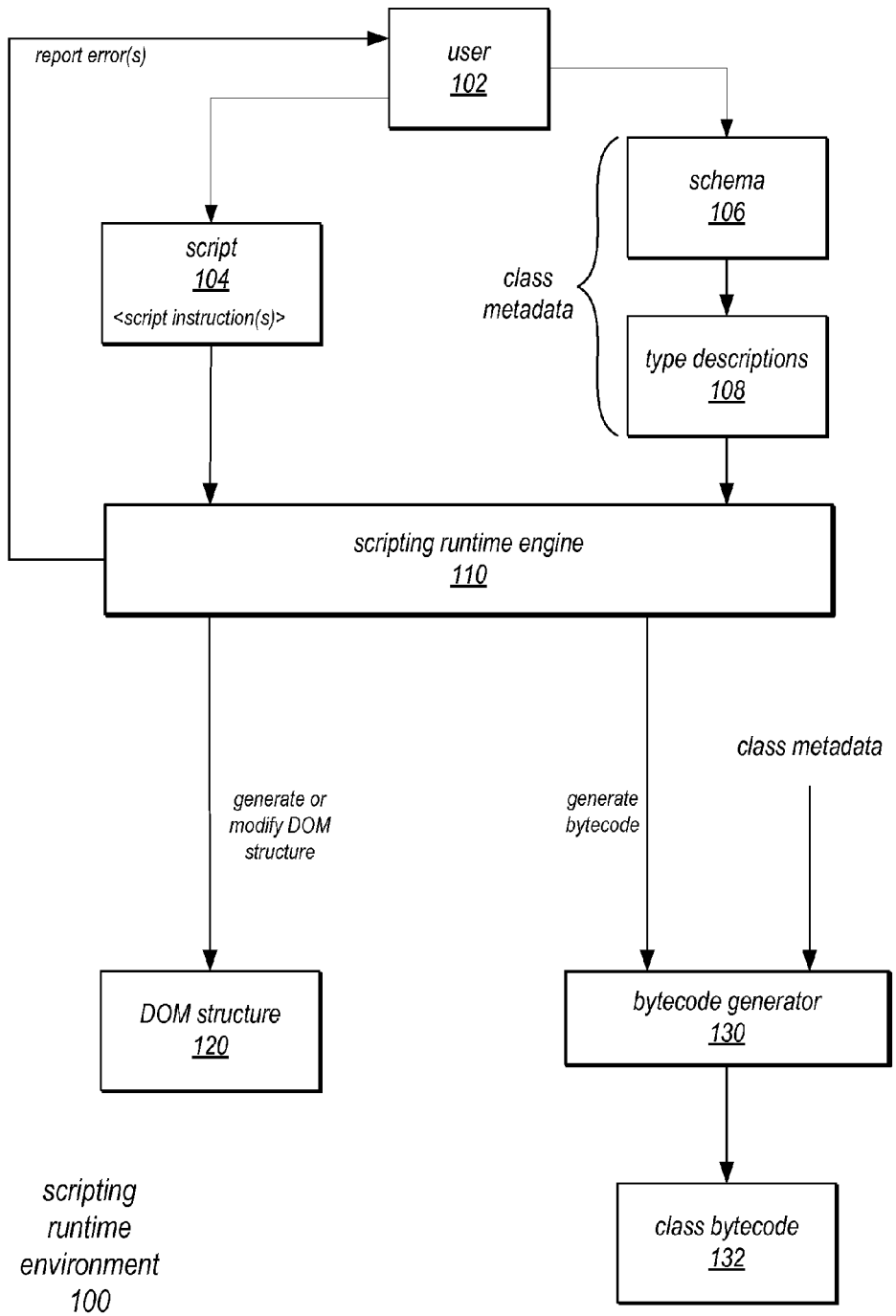
FIG. 1 is a block diagram of a scripting runtime environment including a scripting runtime engine that implements a markup language integration method, according to at least some embodiments.

While the system is described herein by way of example for several embodiments and illustrative drawings, those skilled in the art will recognize that the system is not limited to the embodiments or drawings described. It should be understood, that the drawings and detailed description thereto are not intended to limit the system to the particular form disclosed but on the contrary, the intention is to cover all modifications, equivalents and alternatives falling within the spirit and scope of the present system as defined by the appended claims. The headings used herein are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words, "include", "including", and "includes" mean including, but not limiting to.

DETAILED DESCRIPTION OF THE EMBODIMENTS

Embodiments of methods and apparatus for marshalling markup language (e.g., Extensible Markup Language (XML)) objects into object-oriented programming language (e.g., Java® technology programming language) objects when executing scripts in a scripting language runtime environment are described. Embodiments of a markup language integration method that may be implemented by scripting runtime engines in scripting runtime environments are described that allow the use of simple and complex markup language (e.g., XML schema) structures in scripts. In at least some embodiments of the scripting runtime engine, XML Schema Definition (XSD) elements and types are made accessible in scripting applications or scripting modules within applications. Via a scripting interface, users (e.g., developers, programmers, or other script users) may include and manipulate XML schema structures in scripts. However, rather than compiling the entire XML schema prior to execution of the script as in conventional data binding frameworks, instances (e.g., Java® technology bytecode) of just the XML schema structures referenced by the script may be created, type checked, and dynamically linked at runtime of the script. Thus, the compilation step is avoided, and only objects for the XML schema structures that are needed by the script are generated.

In at least some embodiments, when a script is compiled or executed, Java® bytecode may be generated corresponding to the XML schema structure(s) referenced by the script, for example from class metadata (e.g., class definitions) generated from the respective XML schema structure(s). During execution of the script, the Java® bytecode may be dynamically linked in the runtime environment (e.g., Java® Virtual Machine (JVM®) technology runtime environment).

In at least some embodiments, Document Object Model (DOM) structures (which may also be referred to as DOM objects) may be passed as input arguments to a script and/or may be created by the script. In at least some embodiments, during execution of a script, the DOM objects may be incrementally constructed or modified by the scripting runtime engine according to the XML schema structure(s) referenced by the script. The XML classes defined by the structures in the schema act as wrappers for the DOM objects; when a field of a class object defined by an XML schema structure is updated by the script, the corresponding DOM object is also updated. Thus, embodiments avoid the need for serialization and deserialization of the XML schema structures as in conventional data binding frameworks.

In at least some embodiments, XML schema type definitions are made available in the scripting runtime environment, and thus type checking may be applied to script instructions that reference the XML schema structures to catch errors during development.

Thus, embodiments of the scripting runtime engine generate object-oriented programming language (e.g., Java®) classes on demand in a type safe way, only generating classes for those markup language (e.g., XML) schema structures that are referenced by the script. In addition, embodiments may wrap object model (e.g., DOM) objects in markup language (e.g., XML) classes as defined by the structures in the schema, thus not requiring serialization and deserialization of the markup language structures to generate the object model structures. Using embodiments of the scripting runtime engine, scripts created or modified by script developers may create, reference, and modify objects as defined by a schema while having a strong type checking mechanism to prevent coding errors. A developer may modify a script and/or the schema structures referenced by a script, and the script can be executed without requiring the recompilation of the entire schema as classes are dynamically generated during script execution for only the schema structures referenced by the script, thus saving time. In addition, object model (e.g., DOM) objects, which may be passed into the script as arguments or created in response to script instructions, are wrapped in the classes defined by the schema and are directly manipulated by the script in a type safe way. Thus, the developer does not have to worry about the object model structure (e.g., the DOM tree) or its validity.

Figure 7:
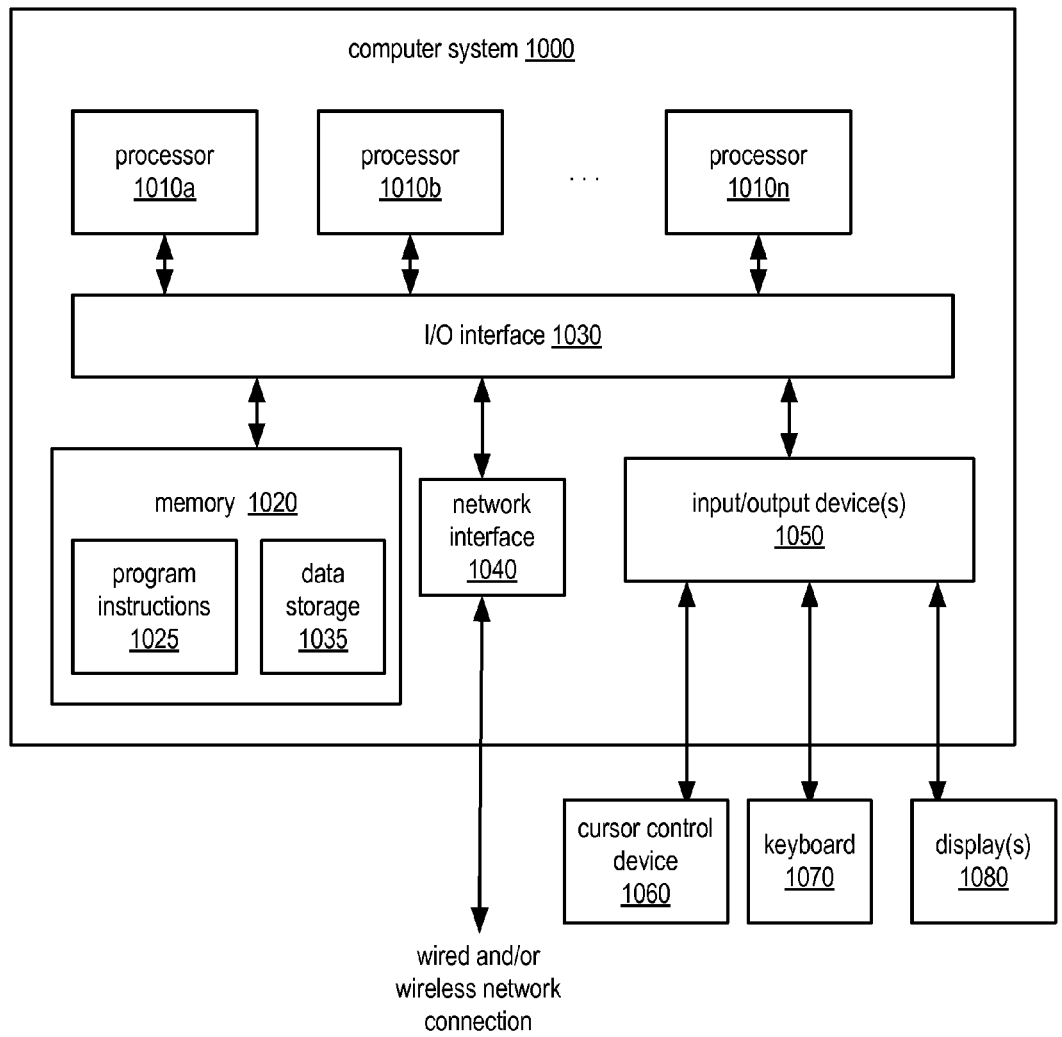
FIG. 7 is a block diagram of a computing device, according to some embodiments.

Embodiments of the scripting runtime engine may, for example, be implemented as or in a standalone scripting application or as a scripting module or plug-in in various application environments. An example process management application environment in which embodiments may be implemented is described later in this document in the section titled Example application. An example of a computing device in which embodiments may be implemented is illustrated in FIG. 7, described later in this document.

While embodiments of the markup language integration method are generally described in the context of integrating XML at runtime in scripting programs in Java® technology environments, specifically in the Java® Virtual Machine (JVM®) technology runtime environment, it is to be noted that embodiments may be applied to other markup languages, other types of programs, other object-oriented programming languages, and/or other types of runtime environments. In addition, while embodiments are generally described in the context of wrapping Document Object Model (DOM) objects with markup language (e.g., XML) schema structures, other object models than DOM may be used in some embodiments. In addition, while embodiments are generally described in which the XML Schema Definition (XSD) is used to define the XML schema, other methods than XSD may be used to define the XML schemas in some embodiments.

FIG. 1 is a block diagram of a scripting runtime environment 100 including a scripting runtime engine 110 that implements a markup language integration method, according to at least some embodiments. In the scripting runtime environment 100, input to a scripting runtime engine 110 may include a script 104 and class metadata that may be accessed by the script.

The class metadata may include type descriptions 108 that may, for example, be generated by parsing the XML structures as defined in a schema 106. The type descriptions 108 may be viewed as an intermediate model between the markup language structures defined in the schema 106 and the object model used at runtime of the script. An example XML schema or portion thereof is given below in the section titled Example schema. An example type description for an example schema structure is provided later in this document in the section titled Mapping of XML schema structures with type descriptions. In at least some embodiments, the schema 106 may be persistent, while the type descriptions 108 may only be generated from the schema 106 and maintained in the runtime environment. A collection of type descriptions 108 in the runtime environment may be referred to herein as a catalog.

In at least some embodiments, a user 102 (e.g., a developer, programmer, or other user) may add new schema structures and/or modify existing schema structures in schema 106 via a user interface, for example prior to or during development a script 104. During script development in the runtime environment, when a schema structure is added to or modified in schema 106, the schema 106 may be parsed to generate a type description for the schema structure in the catalog. In at least some embodiments, type descriptions are only updated in the catalog for schema structures that have been added to or modified in the schema 106. Note that the catalog may include type descriptions for many objects, even thousands or more of type descriptions, while a given script may only reference a few of the objects from the catalog.

The user 102 (e.g., a developer, programmer, or other script user) may create or modify a script 104, for example via user input to a scripting interface to a scripting runtime engine 110 provided by a standalone scripting application or by a scripting module or plug-in in an application or program environment. The script 104 may include one or more interpretable script instructions according to a scripting language. During script development, the user 102 may add, delete, and/or modify the script instructions via the scripting interface. Examples of scripts are provided later in this document, for example in the section titled Example script.

A script instruction may reference one or more simple or complex markup language (e.g., XML) schema structures or elements as defined in a schema 106, for example an XML schema as defined in one or more XSD files. An example XML schema or portion thereof is given below in the section titled Example schema. For example, a script instruction may reference a schema structure to create an instance of the class defined by the schema structure (also referred to as a class object), as in the following non-limiting example instructions. Note that the double slashes indicate comments:

Shiporder.Shipto shipto=new Shiporder.Shipto( ); //generate a Shiporder.Shipto object Shiporder.Item item1=new Shiporder.Item( ); //generate a Shiporder.Item object Shiporder order=new Shiporder( ); //generate a Shiporder object As another example, a script instruction may reference class objects corresponding to schema structure(s) to set or get values of various element(s) of the class objects as defined by the schema structure(s), as in the following non-limiting example instructions to set and get fields in example class objects:

shipto.address="123 Main Street"; //sets shipto.address order.shipto=shipto; //sets order.shipto item1.title="Paper clips"; //sets item1.title item1.quantity=24; //sets item1.quantity printIn "Item:"+item1.title+"; Qty:"+item1.quantity //gets item1.title and item1.quantity An execution of the script 104 may be initiated, for example by input (e.g., command line input) to a scripting user interface. In at least some embodiments, one or more arguments may optionally be provided for the script via the command line, as in the following non-limiting form:

>myscript [−argument(s)]

For example, a reference to an existing DOM object corresponding to a schema structure may be input to a script as a command line argument. The script 104 may include one or more instructions to set and/or get fields in DOM objects that are input as arguments to the script. In addition, the script may output one or more arguments, for example a reference to a DOM object generated by the script.

In at least some embodiments, when a script is executed to which an existing DOM object is input, a bytecode generator 130 component may generate class bytecode 132 (i.e., a class object) corresponding to the input DOM object from class metadata for the respective schema structure, for example from a class description contained in a catalog. In at least some embodiments, the class bytecode 132 may be generated according to a class definition that was generated by parsing the respective schema structure. The generated class bytecode 132 may be dynamically linked in the runtime environment.

At runtime, the scripting runtime engine 110 may read and parse the script instructions in the input script 104, generally in sequential order from a first instruction to a last instruction. The engine 110 may also perform type checking when parsing the script instructions. As previously described, script instructions may reference a schema structure that defines a class to generate an instance of the schema structure (referred to as a class object) or to set or get values of fields in class objects corresponding to the referenced schema structure.

An instruction being parsed by engine 110 may reference a schema structure that defines a class to generate an instance of the schema structure (referred to as a class object) as shown in the above examples. When the engine 110 encounters such an instruction, the engine 110 may access class metadata (e.g., class metadata maintained in a container or catalog) to obtain a type description for the respective schema structure. An example type description for an example schema structure is provided later in this document in the section titled Mapping of XML schema structures with type descriptions. If a type description for the referenced schema structure cannot be obtained, an error may be generated. If a type description for the referenced schema structure is obtained, the engine 110 may apply the type description to the instruction to determine if the instruction is correct according to the type description. If the instruction is not correct according to the type description, an error may be generated.

If an error was generated when parsing the instruction, the error may be reported to the user 102, for example via an error message displayed to the user interface. The user 102 may then modify the script 104 and/or the schema 106 to correct the error. Note that, if a schema structure in the schema 106 is modified by the user, the schema structure may be parsed to generate an updated class description corresponding to the schema structure. After the user 102 has corrected the error, the script 104 may be re-executed from the beginning, or alternatively script execution may be continued from the instruction at which the respective error was encountered.

Figure 4:
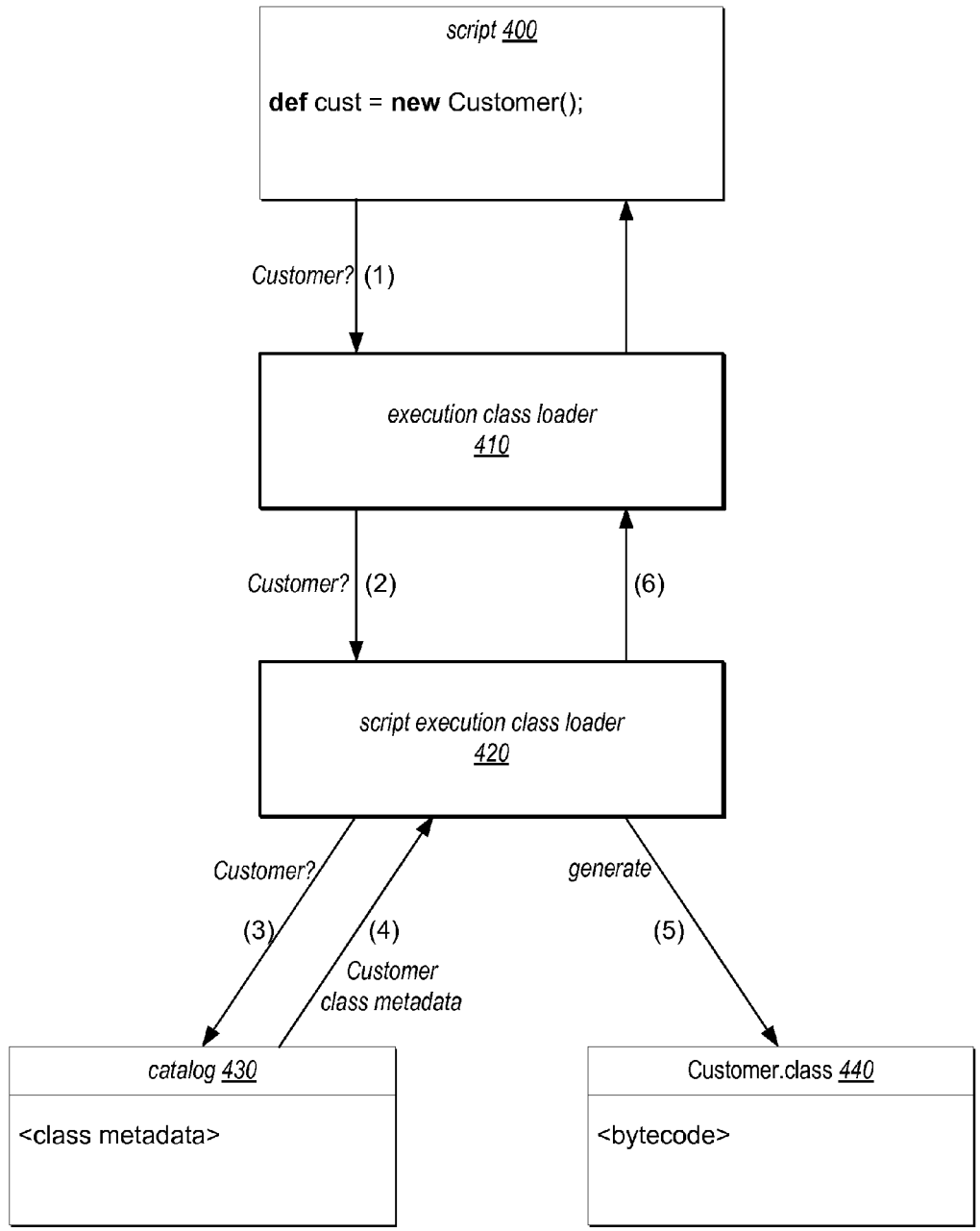
FIG. 4 is a block diagram of class loading at runtime in a scripting environment, according to at least some embodiments.
Figure 5:
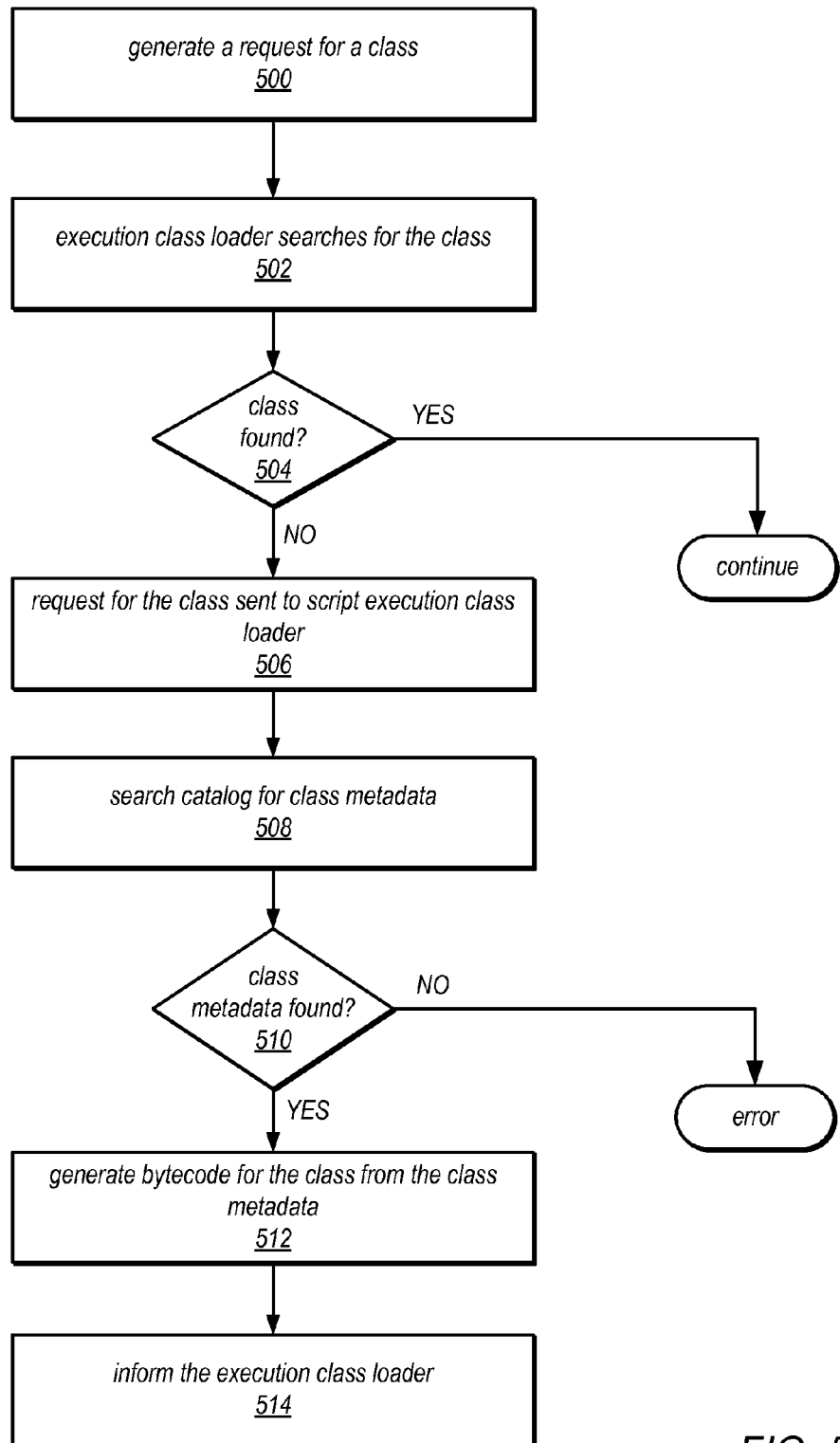
FIG. 5 is a flowchart of a method for class loading at runtime in a scripting environment, according to at least some embodiments.

Once an instruction that references a schema structure that defines a class to generate an instance of the schema structure has been successfully parsed, class bytecode 132 may be generated for the schema structure referenced in the instruction. Note that class bytecode 132 may also be referred to as a class object. In at least some embodiments, a bytecode generator 130 component may generate the class bytecode 132 from class metadata for the respective schema structure, for example from a class description contained in a catalog. In at least some embodiments, the class bytecode 132 may be generated according to a class definition that was generated by parsing the respective schema structure. FIGS. 4 and 5 illustrate a method for generating and loading bytecode for classes at runtime from class metadata using class loaders, according to at least one embodiment. However, other methods may be used to generate the class bytecode 132 in some embodiments. The generated class bytecode 132 may be dynamically linked in the runtime environment (e.g., Java® Virtual Machine (JVM®) technology runtime environment).

In addition, once an instruction that references a schema structure that defines a class to generate an instance of the schema structure has been successfully parsed, the engine 110 may generate a DOM structure 120 according to the respective class metadata; the class metadata acts as a wrapper for the DOM structure 120. An example DOM structure is given below in the section titled Example DOM output. Note that DOM structure 120 may also be referred to as a DOM object.

As previously mentioned, a script instruction being parsed by engine 110 may modify a class object previously generated by the script for a schema structure as described above, or alternatively may modify a class object corresponding to a DOM object obtained as an input argument to the script. For example, the instruction may set a value of an element of the class object as defined by the schema structure corresponding to the class object. In at least some embodiments, when the engine 110 encounters such an instruction, the engine 110 may type check the instruction according to the type description corresponding to the respective object type. If type checking detects an error in the instruction, the error may be reported to the user 102, for example via an error message displayed to the user interface. The user 102 may then modify the script 104 and/or the schema 106 to correct the error. Note that, if a schema structure in the schema 106 is modified by the user 102, the schema structure may be parsed to generate an updated class description corresponding to the schema structure. After the user 102 has corrected the error, the script 104 may be re-executed from the beginning, or alternatively script execution may be continued from the instruction at which the respective error was encountered.

Once the instruction that modifies a class object parses successfully, then the script instruction may be executed to modify the class object. In executing the instruction, the DOM structure 120 corresponding to the referenced class object is also modified according to the instruction, for example by setting a value of an element in the DOM structure 120 to a value indicated in the script instruction. Thus, each time a class object generated by the script is modified by a script instruction, the underlying DOM structure 120 is also modified.

Figure 2:
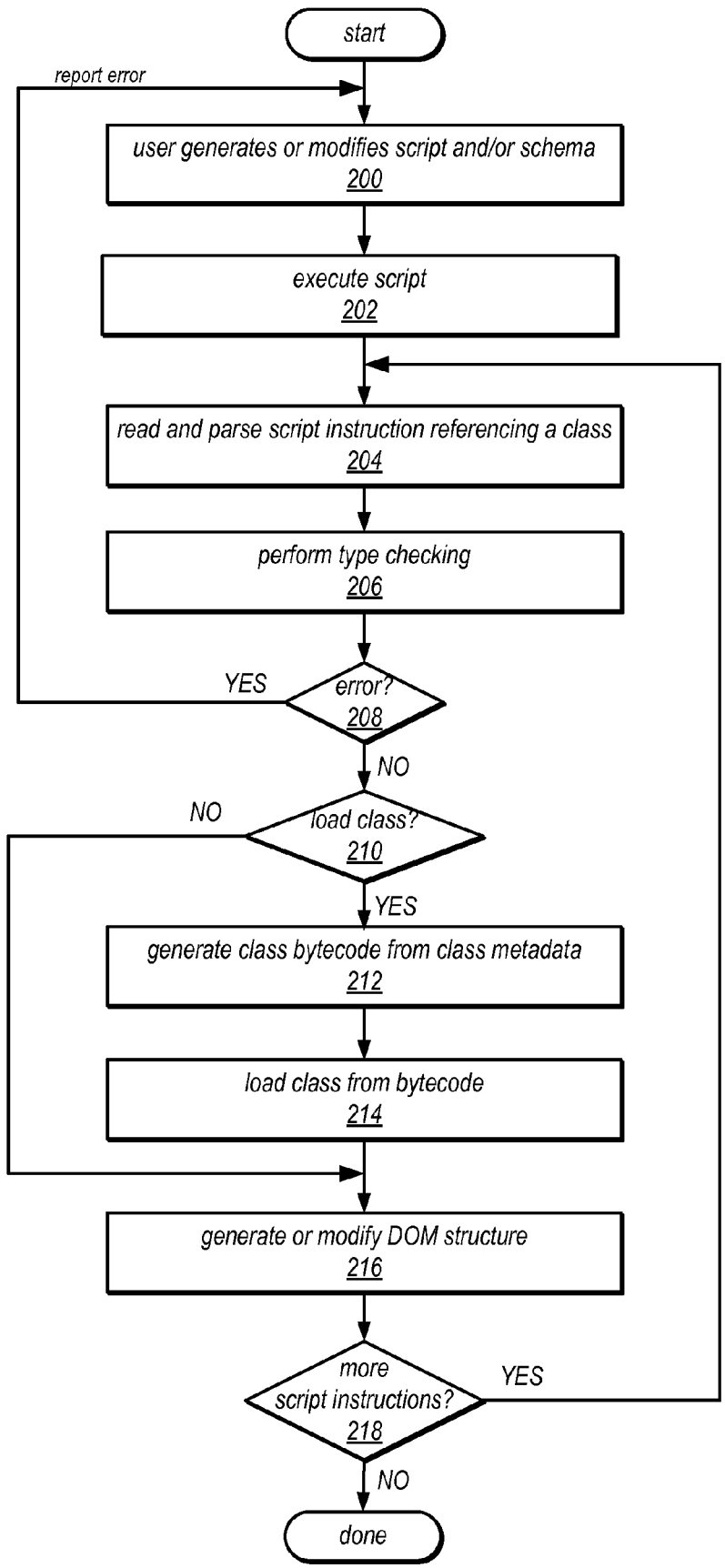
FIG. 2 is a flowchart of a method for markup language integration at runtime in a scripting environment, according to at least some embodiments.

FIG. 2 is a flowchart of a method for markup language integration at runtime in a scripting environment, according to at least some embodiments. As indicated at 200, a user (e.g., a developer, programmer, or other script user) may create or modify a script, for example via user input to a scripting interface provided by an application that supports scripting. The user may add, delete, and/or modify the script instructions via the scripting interface.

At 200, the user may also add and/or modify schema structure(s) in the schema via the user interface. In at least some embodiments, each schema structure that is added or modified may be parsed to generate a type description corresponding to the respective object type. If the schema structure is determined to be invalid by the parser for some reason, an error may be reported to the user via the user interface and the user may correct the schema structure accordingly; the schema structure is then re-parsed. The generated type description(s) may, for example, be maintained as class metadata in a catalog for a project for which the script is being developed. In at least some embodiments, the type descriptions are not persisted, and may only be generated from the schema and maintained in memory in the runtime environment.

As indicated at 202, an execution of the script may be initiated, for example by input to the user interface. To execute the script, a scripting runtime engine may read and parse the script instructions in the script, generally in sequential order from a first instruction to a last instruction. Elements 204 through 218 may be iteratively performed during execution.

As indicated at 204, a script instruction referencing a class may be read and parsed. For example, an instruction being parsed may reference a class defined by a schema structure to generate an instance of the class (also referred to as a class object), as in the following example script instructions:

def ship=new Shiporder( ); //generate a Shiporder object
    def address=new Address( ); //generate an Address object As another example, a script instruction being parsed may reference a class object generated for a schema structure to set or get a value of an element of the class object as defined by the schema structure corresponding to the class object, as in the following example script instructions:

address.street="123 Main Street" //sets address.street to the string "123 Main Street"
    ship.address=address //sets ship.address to reference the generated Address object
    println ship.address.street //gets street and prints "123 Main Street"

As indicated at 206, type checking may be performed for the instruction and the class(es) referenced by the instruction. In at least some embodiments, the instruction may be type checked according to the type description corresponding to the respective object type.

At 208, if type checking detects an error in the instruction, the method may return to element 200. The error may be reported to the user, for example via an error message displayed to a user interface. The user may modify the script and/or the schema to correct the error. If a schema structure in the schema is modified by the user, the schema structure may be parsed to generate an updated class description corresponding to the schema structure. After the user has corrected the error, the script may be re-executed from the beginning, or alternatively script execution may be continued from the instruction at which the respective error was encountered.

At 208, if there is no error in the instruction, then at 210, if the referenced class needs to be loaded, elements 212 and 214 may be performed. As indicated at 212, bytecode for the class may be generated according to metadata for the class, if necessary. In at least some embodiments, the class bytecode may be generated according to a type description for the schema structure, for example a type description that was previously generated by parsing the schema structure. However, other methods may be used to generate the class bytecode in some embodiments. In at least some embodiments, generated bytecode may be persisted between executions of the script, and thus bytecode may only be generated at 212 for classes for which the corresponding schema structure was created or modified since the previous execution of the script. Note that the class bytecode may also be referred to as a class object.

As indicated at 214, the class may be loaded into the runtime environment. In at least some embodiments, the class may be loaded according to a dynamic linking technique applied to the class bytecode. In at least some embodiments, the runtime environment (e.g., the JVM runtime environment) may provide a dynamic linking mechanism that may be leveraged to load the class from the bytecode. FIGS. 4 and 5 illustrate a method for generating and loading bytecode for classes at runtime using class loaders, according to at least one embodiment.

As indicated at 216, a DOM structure corresponding to the referenced class may be generated or modified. If the instruction being parsed references a class defined by a schema structure to generate an instance of the class, then a DOM structure for the class may be generated. If the script instruction being parsed references a class object to modify the class, for example to set a value of an element of the class object as defined by the respective schema structure, then a DOM structure that already exists for the class may be modified accordingly. Note that the DOM structure that is modified may have been passed into the script as an input argument or may have been generated in response to a previous script instruction. If the script instruction being parsed references a class object to get a value of an element of the class object as defined by the respective schema structure, then the DOM structure is not modified.

At 218, if there are more script instructions to be read and parsed, then the method may return to element 204 to continue execution of the script. Otherwise, the method is done.

Using the above method, the user (e.g., a programmer or developer) may execute the script. During execution of the script, type checking is applied to the instructions and the classes referenced by the instructions. Bytecode is dynamically generated and linked for only the class(es) used in the script, so precompiling of the entire schema into class objects is not required as in conventional data binding frameworks. Type-safe DOM structures are also incrementally constructed for the classes by the scripting runtime engine according to the script instructions. Thus, type-safe DOM structures are made available to the user without requiring serialization and deserialization of the markup language structures as in conventional data binding frameworks. The user may add instructions to or modify instructions in the script, and may also modify the schema structures referenced by the script as necessary or desired, and the script can be re-executed without requiring recompiling of the entire schema, as the class objects and DOM objects are dynamically generated for only those schema structures referenced by the script during script execution.

Figure 3A:
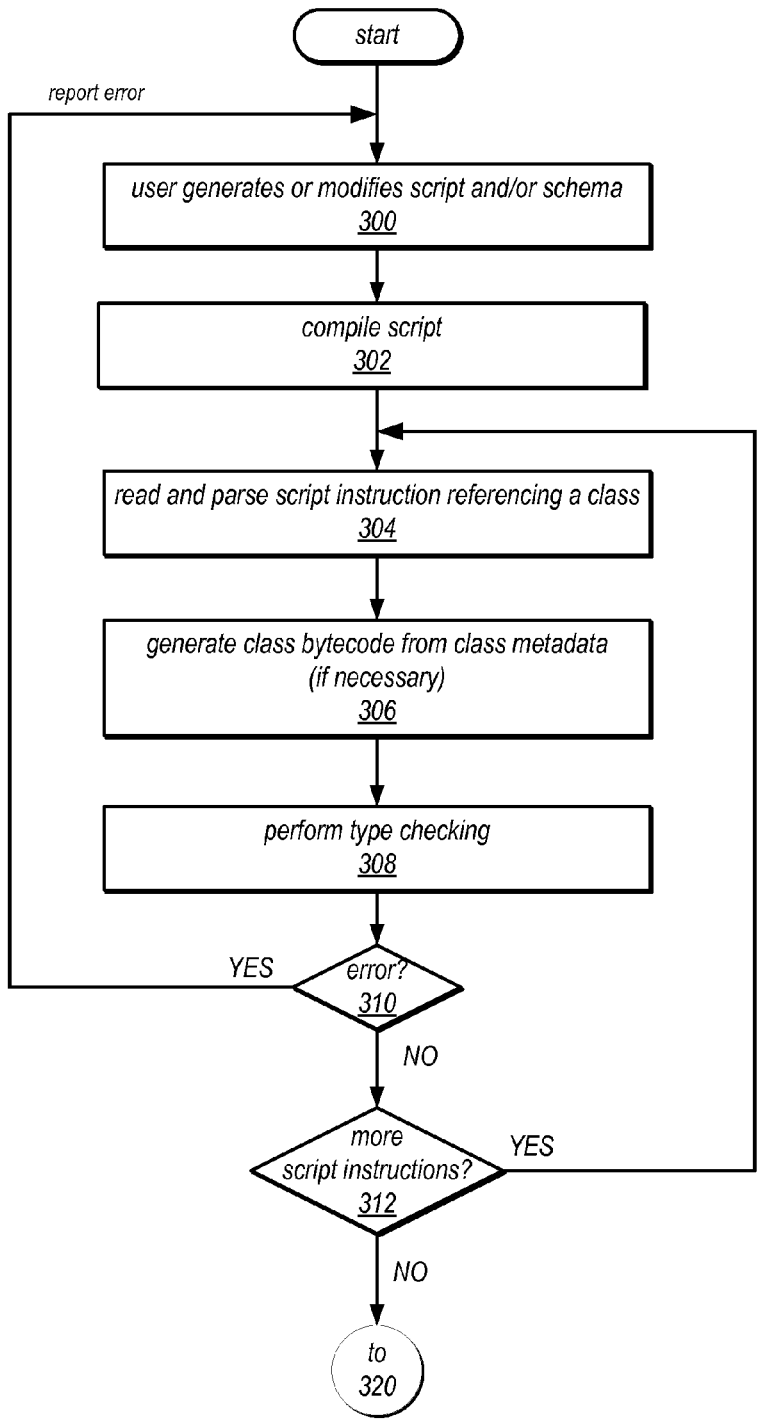
FIGS. 3A and 3B are flowcharts of a method for markup language integration at runtime in a scripting environment that involves compiling the script before executing the script, according to at least some embodiments.
Figure 3B:
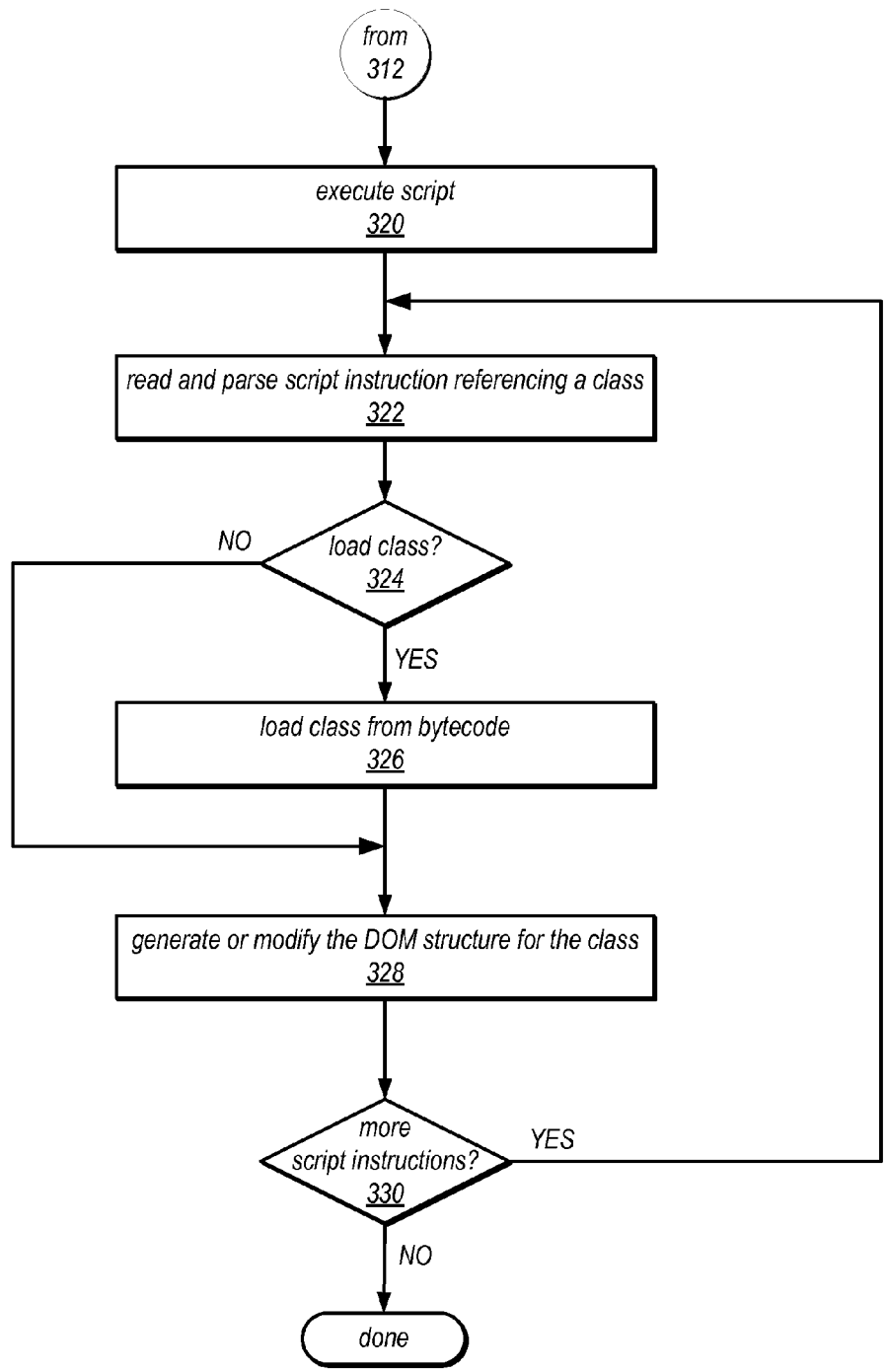

The method as illustrated in FIG. 2 involves markup language integration at runtime when executing a script. However, some scripting languages (e.g., Groovy) allow scripts to be statically compiled prior to execution. In these scripting languages, an alternative method may be used. FIGS. 3A and 3B are flowcharts of a method for markup language integration at runtime in a scripting environment that involves compiling the script prior to executing the script, according to at least some embodiments.

FIG. 3A is a flowchart of a compilation portion of the method for markup language integration, according to at least some embodiments. As indicated at 300, a user (e.g., a developer, programmer, or other script user) may create or modify a script, for example via user input to a scripting interface provided by an application that supports scripting. The user may add, delete, and/or modify the script instructions via the scripting interface.

At 300, the user may also add and/or modify schema structure(s) in the schema via the user interface. In at least some embodiments, each schema structure that is added or modified may be parsed to generate a type description corresponding to the respective object type. If the schema structure is determined to be invalid by the parser for some reason, an error may be reported to the user via the user interface and the user may correct the schema structure accordingly; the schema structure is then re-parsed. The generated type description(s) may, for example, be maintained as class metadata in a catalog for a project for which the script is being developed. In at least some embodiments, the type descriptions are not persisted, and may only be generated from the schema and maintained in memory in the runtime environment.

As indicated at 302, a compilation of the script may be initiated, for example by input to the user interface. To compile the script, a compilation engine or module of the scripting language may read and parse the script instructions in the script, generally in sequential order from a first instruction to a last instruction. Elements 304 through 312 may be iteratively performed during compilation.

As indicated at 304, a script instruction referencing a class may be read and parsed. For example, an instruction being parsed may reference a class defined by a schema structure to generate an instance of the class (also referred to as a class object). As another example, a script instruction being parsed may reference a class object generated for a schema structure to set or get a value of an element of the class object as defined by the schema structure corresponding to the object.

As indicated at 306, bytecode for the class may be generated according to metadata for the class, if necessary. In at least some embodiments, generated bytecode may be persisted, and thus bytecode may only be generated for classes for which the corresponding schema structure was created or modified since the previous compilation of the script. In at least some embodiments, the class bytecode may be generated according to a type description for the schema structure, for example a type description that was previously generated by parsing the schema structure. However, other methods may be used to generate the class bytecode in some embodiments.

As indicated at 308, type checking may be performed for the instruction and the class(es) referenced by the instruction. In at least some embodiments, the instruction may be type checked according to the type description corresponding to the respective object type.

At 310, if type checking detects an error in the instruction, the method may return to element 300. The error may be reported to the user, for example via an error message displayed to a user interface. The user may modify the script and/or the schema to correct the error. After the user has corrected the error, the script may be re-compiled from the beginning, or alternatively script compilation may be continued from the instruction at which the respective error was encountered.

At 310, if there is no error in the instruction, the method proceeds to 312. At 312, if there are more script instructions to be compiled, then the method may return to element 304 to continue compilation of the script. Otherwise, the compilation is done, and the method may continue at element 320 of FIG. 3B.

Note that the order of the elements in the flowchart of FIG. 3A may be varied. For example, in some embodiments, generating bytecode at 306 may be performed after elements 308 and 310.

FIG. 3B is a flowchart of an execution portion of the method for markup language integration, according to at least some embodiments. As indicated at 320, an execution of the script may be initiated, for example by input to the user interface. To execute the script, a scripting runtime engine may read and parse the script instructions in the script, generally in sequential order from a first instruction to a last instruction. Elements 322 through 330 may be iteratively performed during execution.

As indicated at 322, a script instruction referencing a class may be read and parsed. For example, an instruction being parsed may reference a class defined by a schema structure to generate an instance of the class (also referred to as a class object). As another example, a script instruction being parsed may reference a class object generated for a schema structure to set or get a value of an element of the class object as defined by the schema structure corresponding to the object.

At 324, if the class referenced by the instruction does not need to be loaded (i.e., the class is already loaded in the runtime environment), then the method proceeds to element 328. Otherwise, at 324, if the class referenced by the instruction needs to be loaded, then as indicated at 326 the class may be loaded into the runtime environment. In at least some embodiments, the class may be loaded according to a dynamic linking technique applied to the class bytecode generated at element 306 when the script was compiled in FIG. 3A. In at least some embodiments, the runtime environment (e.g., the JVM runtime environment) may provide a dynamic linking mechanism that may be leveraged to load the class from the generated bytecode. FIGS. 4 and 5 illustrate a method for generating and loading bytecode for classes at runtime using class loaders, according to at least one embodiment. Once the class is loaded at 326, the method proceeds to element 328.

As indicated at 328, a DOM structure corresponding to the referenced class may be generated or modified. If the instruction being parsed references a class defined by a schema structure to generate an instance of the class, then a DOM structure for the class may be generated. If the script instruction being parsed references a class object to modify the class, for example to set a value of an element of the class object as defined by the respective schema structure, then a DOM structure that already exists for the class may be modified accordingly. Note that the DOM structure that is modified may have been passed into the script as an input argument or may have been generated in response to a previous script instruction. If the script instruction being parsed references a class object to get a value of an element of the class object as defined by the respective schema structure, then the DOM structure is not modified.

At 330, if there are more script instructions to be read and parsed, then the method may return to element 322 to continue execution of the script. Otherwise, the method is done.

Using the above method, the user (e.g., a programmer or developer) may first compile and then the script. During compilation of the script, type checking is applied to the instructions and the classes referenced by the instructions, and bytecode is generated for only the class(es) used in the script, so precompiling of the entire schema into class objects is not required as in conventional data binding frameworks. During script execution, type-safe DOM structures are incrementally constructed for the classes by the scripting runtime engine according to the script instructions. Thus, type-safe DOM structures are made available to the user without requiring serialization and deserialization of the markup language structures as in conventional data binding frameworks. The user may add instructions to or modify instructions in the script, and may also modify the schema structures referenced by the script as necessary or desired, and the script can be recompiled and executed without requiring recompiling of the entire schema, as the bytecode (class objects) and DOM objects are dynamically generated for only those schema structures referenced by the script at script runtime.

FIG. 4 is a block diagram of class loading at runtime in a scripting environment, according to at least some embodiments. An example script 400 may include one or more instructions referencing a class or classes. An example instruction to generate an object of a class "Customer" is shown. Alternatively, an input argument to the script may indicate a DOM object for which a class object needs to be generated. During execution of the script 400, one or more class loaders (e.g., script execution class loader 420) may be created that may provide bytecode for classes that are not found by the execution class loader 410.

Catalog 430 may contain class metadata (e.g., type descriptions generated from the schema) for any number of classes, for example classes used in a project or all classes that may be made available to an application that provides a scripting runtime environment.

During execution of the script 400, the scripting runtime engine may read and parse an instruction that references a class, as in the example instruction:

def cust=new Customer( ); //generate an object of type Customer

The scripting runtime engine may perform type checking of the instruction, and may generate or modify a DOM structure for the class (e.g., Customer) as previously described. A request for the class (e.g., Customer) is received or obtained by the execution class loader 410, as indicated at (1). The execution class loader 410 may attempt to find the class, and if not successful, may pass the load request on to a script execution class loader 420, as indicated at (2). At (3) and (4), the script execution class loader 420 may access a catalog 430 to obtain class metadata for the class, for example a class description corresponding to the requested class (e.g., Customer). At (5), the script execution class loader 420 generates bytecode for the class (Customer.class 440) from the class metadata obtained from the catalog, for example according to a type description corresponding to the requested class. At (6), the script execution class loader 420 informs the execution class loader 410, which may then dynamically link the bytecode 440 for the class into the runtime environment. Alternatively, the script execution class loader 420 may dynamically link the bytecode 440 into the runtime environment, and then inform the execution class loader 410 that the class is loaded.

FIG. 5 is a flowchart of a method for class loading at runtime in a scripting environment, according to at least some embodiments. During execution of a script, one or more class loaders (which may be referred to as script execution class loaders) may be created that may provide bytecode for classes that are not found by an execution class loader of the runtime environment. As indicated at 500, a request for a class is generated. For example, a scripting runtime engine may encounter an instruction in a script being executed that references the class. As indicated at 502, the execution class loader may receive the request and search for the requested class. At

504, if the execution class loader locates the class, then the execution class loader may handle loading the class if necessary. At 504, if the execution class loader cannot locate the class, then at 506 the execution class loader sends the request to a script execution class loader. As indicated at 508, the script execution class loader may search a catalog for metadata for the requested class. The catalog may contain class metadata (e.g., type descriptions, etc.) for any number of classes, for example classes used in a project or all classes that may be made available to an application that provides a scripting runtime environment.

At 510, if class metadata for the requested class is not found in the catalog, then an error may be generated. At 510, if class metadata for the requested class is found in the catalog, then at 512 the script execution class loader may generate bytecode for the class according to the respective class metadata, for example according to a type description corresponding to the requested class. In at least some embodiments, the script execution class loader may dynamically link the bytecode into the runtime environment. As indicated at 514, the script execution class loader may then inform the execution class loader that the class is loaded. Alternatively, the script execution class loader may inform the execution class loader that the class bytecode has been generated, and the execution class loader may handle the dynamic linking of the class bytecode in the runtime environment.

Example Markup Language (XML) Documents and Script

The following provides an example XSD file as an example XML schema, an example script that references XML structures in the example schema, and an example DOM XML structure that may be generated by executing the script, according to at least some embodiments. Note that these examples are not intended to be limiting.

Example Schema

The following is an example of an XML schema or portion thereof as defined in an XSD file (e.g., Shiporder.XSD). Note that this example is not intended to be limiting:

```
<?xml version="1.0" encoding="ISO-8859-1"?>
<xs:schema xmlns:xs=" (URL) ">
  <xs:element name="shiporder">
    <xs:complexType>
      <xs:sequence>
        <xs:element name="orderperson" type="xs:string"/>
        <xs:element name="shipto">
          <xs:complexType>
            <xs:sequence>
              <xs:element name="name" type="xs:string"/>
              <xs:element name="address" type="xs:string"/>
              <xs:element name="city" type="xs:string"/>
              <xs:element name="country" type="xs:string"/>
            </xs:sequence>
          </xs:complexType>
        </xs:element>
        <xs:element name="item" maxOccurs="unbounded">
          <xs:complexType>
            <xs:sequence>
              <xs:element name="title" type="xs:string"/>
              <xs:element name="note" type="xs:string" minOccurs="0"/>
              <xs:element name="quantity" type="xs:positiveInteger"/>
              <xs:element name="price" type="xs:decimal"/>
            </xs:sequence>
          </xs:complexType>
```

-continued

```
        </xs:element>
        ...
```

Example Script

The following is an example of a script or portion thereof that references elements in the above example schema. The script may specify Java® classes using names (e.g., Shiporder, Shiporder.Shipto, Shiporder.Item, etc.) to access and construct XML documents. Note that this example is not intended to be limiting:

```
Shiporder.Shipto shipto=new Shiporder.Shipto( );
shipto.address="123 Main Street";
shipto.city="Anywhere";
Shiporder.Item item1=new Shiporder.Item( );
item1.title="Paper Clips";
item1.quantity=10;
item1.price=4.79;
Shiporder.Item item2=new Shiporder.Item( );
item2.title="Permanent Markers";
item2.quantity=12;
item2.price=7.99;
Shiporder order=new Shiporder( );
order.orderperson="John Q";
order.shipto=shipto;
order.item.add(item1);
order.item.add(item2);
```

Example DOM Output

The following is an example DOM XML structure that may be incrementally constructed by the example script given above:

```
<?xml version="1.0" encoding="UTF-8"?>
<Shiporder>
  <orderperson>John Q</orderperson>
  <shipto>
    <name/>
    <address>123 Main Street</address>
    <city>Anywhere</city>
    <country/>
  </shipto>
  <item>
    <title>Paper Clips</title>
    <note/>
    <quantity>10</quantity>
    <price>4.79</price>
  </item>
  <item>
    <title>Permanent Markers</title>
    <note/>
    <quantity>12</quantity>
    <price>7.99</price>
  </item>
</Shiporder>
```

Mapping of XML Schema Structures with Type Descriptions

In at least some embodiments, type descriptions may be used to represent basic data types (e.g., Strings, Integer, Decimal, etc.), as well as complex structures as objects (with attributes and methods). The type descriptions may be used, for example, in type checking script instructions being parsed by a scripting runtime engine and in generating bytecode for a class as previously described. Type descriptions may be obtained from various sources (e.g., from Web Services Definition Language (WSDL)), and/or may be generated by parsing schema structures (e.g., the XML schema structures specified in XSD files). In some cases, type descriptions may be created or modified by users (e.g., a developer). In at least some embodiments, to facilitate the use of schema components or structures in an application environment, type descriptions may be created to model each structure declared in any schema used in the application environment. In some cases there may be an obvious mapping from a schema structure or component to an existing type description, especially for basic or built-in types such us String, Integer, Date, etc. In general, however, new type descriptions specific to a schema that is being used may be required, and thus may be generated by parsing the schema structure(s) created or modified by a user (e.g., a developer).

The following is an example XML schema structure, and is not intended to be limiting:

```
<xsd:schema xmlns:xsd="(URL)"
    xmlns:ns1="(name space URL)" targetNamespace="(name space URL)">
    <xsd:element name="Address">
        <xsd:complexType>
            <xsd:sequence>
                <xsd:element name="street" type="xsd:string"/>
                <xsd:element name="city" type="xsd:string"/>
                <xsd:element name="state" type="ns1:State"/>
            </xsd:complexType>
        </xsd:element>
        <xsd:simpleType name="State">
            <xsd:restriction base="xsd:string">
                <xsd:enumeration value="BA"/>
                <xsd:enumeration value="CD"/>
                <xsd:enumeration value="SF"/>
            </xsd:restriction>
        </xsd:simpleType>
    </xsd:schema>
```

The following is an example type description generated according to the above example schema structure, and is not intended to be limiting:

```
Address(xml, Object)
    Properties:{namespace=(name space URL),
        nativeName=Address,
        typeId=E|(name space URL)|Address}
    SuperTypes:
        Attributes:
            city:String
            country:String
            state:ObjectDynamicRef(xobject::C|(name space URL)|State)
```

In at least some embodiments, if a type description is referenced that is not a basic or built-in type and thus has been created for the schema, the type may be described as the following:
ObjectDynamicRef(xobject::"typeID property of the created Type Description")
as in the above example for the state attribute:
state:ObjectDynamicRef(xobject::C|(name space URL)|State)

Note, however, that the above description for a type is given as an example, and is not intended to be limiting.

An example type description for the state attribute is given below, and is not intended to be limiting:

```
State(xml, Enum)
    Properties:{namespace=Enumeration,
        nativeName=State,
```

```
        typeId=C|(name space URL)|State}
    Attributes:
        SelectAState:State(xml::C|(name space URL)|State)
        BA:State(xml::C|(name space URL)|State)
        CD:State(xml::C|(name space URL)|State)
        SF:State(xml::C|(name space URL)|State)
```

Example script instructions for the example schema structure that may be type checked at runtime of the script according to the above type descriptions are given below:
Address address=new Address( ); //generate an Address object
address.city="Buenos Aires"; //sets address.city to the indicated string
State state=new State( ); //generate a State object
address.state=state; //sets address.state to the generated State object While not shown, get instructions may also be type checked.

Runtime—DOM Manipulation

In at least some embodiments, XML classes or structures act as wrappers for the DOM objects or structures. Each time a field of an XML class object is updated by an instruction in a script being executed, the corresponding DOM structure is also updated by the scripting runtime engine. This avoids the need to perform serialization and deserialization of the XML structures to obtain and access the DOM structures as in conventional data binding frameworks.

The following provides example XML schemas, and is not intended to be limiting:

```
<?xml version="1.0" encoding="ISO-8859-1"?>
<xs:schema xmlns:xs="(URL)"
    xmlns="(namespace URL)" targetNamespace="(namespace URL)">
    <xs:element name="shiporder">
        <xs:complexType>
            <xs:sequence>
                <xs:element name="orderperson" type="xs:string"/>
                <xs:element name="address" type="address"/>
                <xs:element name="city" type="xs:string"/>
                <xs:element name="country" type="xs:string"/>
            </xs:sequence>
        </xs:complexType>
    </xs:element>
    <xs:element name="address">
        <xs:complexType>
            <xs:sequence>
                <xs:element name="street" type="xs:string"/>
            </xs:sequence>
        </xs:complexType>
    </xs:element>
</xs:schema>
```

The following provides an example script that references structures in the above schemas:
def ship=new Shiporder( );
def address=new Address( );
address.street="123 Main Street"
ship.address=address
ship.city="Anywhere"
ship.country="USA"
ship.orderperson="Smith";
printIn "The package will be send to"+ship.addres.street
printIn "City:"+ship.city++ship.country
printIn "to:"+ship.orderperson The example script includes calls to both "setter" and "getter" methods. Any 'get' operation returns a reference to an element, as in:

customer.address.street="123 Main Street" //sets street to "123 Main Street"

println customer.address.street //gets street and prints "123 Main Street"

Any 'set' operation stores a copy of the value:

def ship=new Shiporder( ); //generate a Shiporder object def myAddress=new Address( ); //generate an Address object (myAddress)

myAddress.street="123 Main Street" //set myAddress.street ship.address=myAddress //stores a copy of myAddress to ship.address myAddress.street="234 First Street" //this does not modify ship.address println ship.address.street //prints "123 Main Street"

println myAddress.street //prints "234 First Street"

In the above example, when ship and myAddress class objects are generated, a DOM structure is generated for each class object. When myAddress.street is set, the DOM object corresponding to myAddress is modified. When ship.address is set to myAddress, a copy of the myAddress DOM structure (with the street set to "123 Main Street") is generated in the DOM structure corresponding to ship. When myAddress.street is then changed to "234 First Street", the DOM structure corresponding to myAddress is modified, but not the DOM structure corresponding to ship.

Example Application

Embodiments of the methods for marshalling markup language (e.g., Extensible Markup Language (XML)) objects into programming language (e.g., Java®) objects when executing scripts in a scripting language runtime environment as described herein may be used in any application that uses a scripting language to execute scripts that reference markup language schemas. However, an example application for embodiments is described below.

Embodiments of the markup language integration method for integrating markup language structures at runtime in scripting environments may be used in business process management (BPM) application environments. A BPM application may be used to design, simulate, and execute Business Process Model and Notation (BPMN) processes, e.g. BPMN 2.0 processes. BPMN 2.0 is a standard for business process modeling that provides a graphical notation for specifying business processes in a Business Process Diagram (BPD) based on a flowcharting technique. The BPMN 2.0 standard specifies that processes can contain "script tasks" to enable users to include scripts in their processes or projects. BPMN processes typically interact with many XML structures.

Embodiments of the markup language integration method described herein may be used in a BPM application to provide seamless integration in the script language to the XML structures when designing and executing BPMN 2.0 script tasks in processes. Although each project or process developed via the BPM application may include many XML structures, typically users (e.g., developers) will only use a small subset of those structures in a given script. As previously described, in contrast to scripting runtime environments that use conventional data binding frameworks, a scripting runtime engine used by the BPM application that implements an embodiment of the markup language integration method described herein only processes the XML structures that are used in a script being executed. The markup language integration method also provides a type safe mechanism to detect script errors during the development phase, as well as generating DOM structures during script execution without requiring serialization and deserialization of the XML structures.

Example Implementation

Figure 6:
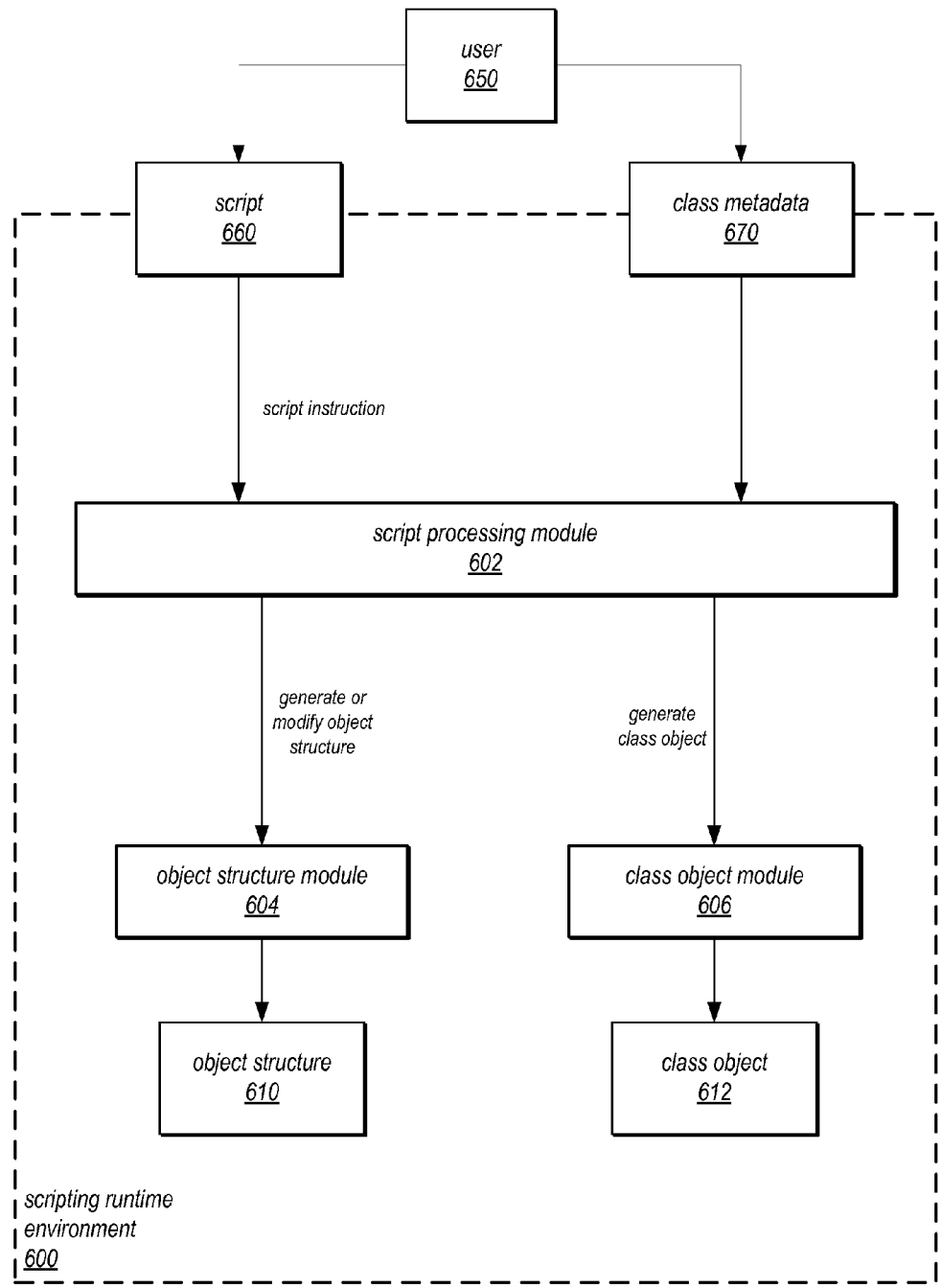
FIG. 6 is a block diagram of an example implementation of a method for markup language integration at runtime in a scripting environment, according to at least some embodiments.

Embodiments of the methods for marshalling markup language (e.g., Extensible Markup Language (XML)) objects into programming language (e.g., Java®) objects when executing scripts in a scripting language runtime environment as described above may, for example, be implemented as one or more modules, as illustrated in FIG. 6. Each module may be implemented in software, hardware, or a combination thereof. As illustrated in FIG. 6, an example embodiment of a scripting runtime environment 600 may include, but is not limited to, a script processing module 602, an object structure module 605, and a class object module 606. The script processing module 602 may sequentially process instructions from a script 660. The instructions may reference one or more classes defined by respective markup language (e.g., XML) structures in a markup language schema that includes markup language structures for multiple classes. In processing a given instruction, the script processing module 602 may determine that a current instruction being processed indicates that an instance of a class that is referenced by the current instruction is to be created. In response, the class object module 606 may obtain class metadata 670 (e.g., a class definition) for the class referenced by the instruction, generate an instance of the class as a class object (e.g., bytecode) according to the class metadata 670 for the class, and load the class object into a runtime environment (e.g., a Java® runtime environment). In addition, the object structure module 604 may generate an object structure 610 (e.g., a DOM object) for the class according to an object model. Alternatively, an object structure 610 for a class may be obtained as an input argument to the script 660.

In processing a subsequent instruction, the script processing module 602 may determine that the instruction being processed indicates that the class object 612 for a class is to be modified. In response, the object structure 610 (e.g., a DOM object) for the class may also be modified according to the instruction, for example by the object structure module 604.

In at least some embodiments, the script processing module 602 may type check the current instruction being processed according to class metadata 670 for the class referenced by the current instruction, for example according to a type description for the class. Upon detecting an error in the script 660, the script processing module 602 may inform the user 650, for example via a user interface. The user 650 may then modify the script 660 and/or the class metadata 670 and re-execute the script. In at least some embodiments, modifying the class metadata 670 may involve modifying a schema structure corresponding to a class as defined in a schema, and regenerating the class definition for the respective class in class metadata 670.

Example System

Various components of embodiments of the methods for marshalling markup language (e.g., Extensible Markup Language (XML)) objects into programming language (e.g., Java®) objects when executing scripts in a scripting language runtime environment as described herein may be executed on one or more computer systems or computing devices, which may interact with various other devices. One such computer system or computing device is illustrated by FIG. 7. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions, components, or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of graphical algorithms. For example, a graphics processor may implement a number of graphics primitive operations in a way that makes executing them much faster than drawing directly to the screen with a host central processing unit (CPU). The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for various embodiments of a markup language integration method, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, configured to implement embodiments of the markup language integration method, and data storage 1035, comprising various data accessible by program instructions 1025. In one embodiment, program instructions 1025 may include software elements of embodiments of the markup language integration method, as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of the markup language integration method as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system comprising:
one or more processors; and
a memory storing program instructions, wherein the program instructions are executable by the at least one of the one or more processors to implement:
a class object module configured to load classes in a runtime environment; and
a script processing module configured to:
process instructions from a script comprising a plurality of instructions, wherein one or more of the plurality of instructions reference one or more classes defined by respective markup language structures in a markup language schema that includes markup language structures for a plurality of classes;
determine, during said processing instructions from the script, that a current one of the plurality of instructions being processed indicates that an instance of one of the one or more classes that is referenced by the current instruction is to be created; and
generate a request for the class referenced by the current instruction in response to said determining;
wherein the class object module is configured to, in response to said request:
obtain class metadata for the class referenced by the current instruction;
generate an instance of the class as a class object according to the class metadata for the class; and
load the class object into the runtime environment;
wherein the script processing module is configured to continue said processing instructions from the script subsequent to said generating the request.

2. The system as recited in claim 1, wherein the program instructions are further executable by the at least one of the one or more processors to implement an object structure module configured to, in response to said determining, generate an object structure for the class according to an object model.

3. The system as recited in claim 2, wherein the object model is Document Object Model (DOM), and wherein the object structure is a DOM object.

4. The system as recited in claim 1, wherein the script processing module is further configured to:
determine that a subsequent one of the plurality of instructions being processed indicates that the class object is to be modified; and
in response to said determining that the instruction being processed indicates that the class object is to be modified, modify an object structure for the class according to the instruction.

5. The system as recited in claim 4, wherein the object structure is a Document Object Model (DOM) object for the class, wherein the DOM object is obtained as an input argument to the script.

6. The system as recited in claim 4, wherein the object structure is a Document Object Model (DOM) object for the class, wherein the program instructions are further executable by the at least one of the one or more processors to implement an object structure module configured to generate the DOM object in response to the script processing module determining that the current instruction being processed indicates that an instance of the class is to be created.

7. The system as recited in claim 1, wherein the class metadata for the class is a type definition for the class generated according to the markup language structure for the class in the schema.

8. The system as recited in claim 1, wherein the markup language is Extensible Markup Language (XML).

9. The system as recited in claim 1, wherein the runtime environment is an object-oriented programming language runtime environment, and wherein the class object is an object-oriented programming language object.

10. The system as recited in claim 9, wherein the plurality of instructions include instructions according to a scripting language of the object-oriented programming language runtime environment, wherein the scripting language is one of Groovy, Jruby, Scala, Fantom, or Jython.

11. The system as recited in claim 9, wherein, to generate an instance of the class as a class object according to the class metadata for the class, the class object module is configured to generate object-oriented programming language bytecode for the class according to the class metadata for the class, and wherein, to load the instance of the class into the runtime environment, the class object module is configured to dynamically link the bytecode for the class into the object-oriented programming language runtime environment.

12. The system as recited in claim 1, wherein the class object module is further configured to type check the current instruction according to a type description for the class referenced by the current instruction.

13. A method, comprising:
processing, by a scripting runtime engine implemented by a computing device, instructions from a script comprising a plurality of instructions, wherein one or more of the plurality of instructions reference one or more classes defined by respective markup language structures in a markup language schema that includes markup language structures for a plurality of classes;
determining, during said processing instructions from the script, that a current one of the plurality of instructions being processed indicates that an instance of one of the one or more classes that is referenced by the current instruction is to be created; and
in response to said determining:
obtaining class metadata for the class referenced by the current instruction;
generating an instance of the class as a class object according to the class metadata for the class; and
loading the class object into a runtime environment on the computing device;
wherein the scripting runtime engine continues said processing instructions from the script subsequent to said determining.

14. The method as recited in claim 13, wherein said processing further comprises:
determining that a subsequent one of the plurality of instructions being processed indicates that the class object is to be modified; and
in response to said determining that the instruction being processed indicates that the class object is to be modified, modifying an object structure for the class according to the instruction.

15. The method as recited in claim 14, wherein the object structure is a Document Object Model (DOM) object for the class, wherein the DOM object is obtained as an input argument to the script or generated by the scripting runtime engine in response to said determining that the current instruction being processed indicates that an instance of the class is to be created.

16. The method as recited in claim 13, wherein the class metadata for the class is a type definition for the class generated according to the markup language structure for the class in the schema, and wherein said processing further comprises type checking the current instruction according to the type description for the class referenced by the current instruction.

17. A non-transitory computer-readable storage medium storing program instructions, wherein the program instructions are computer-executable to implement a scripting runtime engine configured to:
process instructions from a script comprising a plurality of instructions, wherein one or more of the plurality of instructions reference one or more classes defined by respective markup language structures in a markup language schema that includes markup language structures for a plurality of classes;
determine, during said processing instructions from the script, that a current one of the plurality of instructions being processed indicates that an instance of one of the one or more classes that is referenced by the current instruction is to be created; and
in response to said determining:
obtain class metadata for the class referenced by the current instruction;
generate an instance of the class as a class object according to the class metadata for the class; and
load the class object into a runtime environment;
wherein the scripting runtime engine is configured to continue said processing instructions from the script subsequent to said determining.

18. The non-transitory computer-readable storage medium as recited in claim 17, wherein the scripting runtime engine is further configured to:
determine that a subsequent one of the plurality of instructions being processed indicates that the class object is to be modified; and
in response to said determining that the instruction being processed indicates that the class object is to be modified, modify an object structure for the class according to the instruction.

19. The non-transitory computer-readable storage medium as recited in claim 18, wherein the object structure is a Document Object Model (DOM) object for the class, wherein the DOM object is obtained as an input argument to the script or generated by the scripting runtime engine in response to said determining that the current instruction being processed indicates that an instance of the class is to be created.

20. The non-transitory computer-readable storage medium as recited in claim 17, wherein the class metadata for the class is a type definition for the class generated according to the markup language structure for the class in the schema, and wherein the scripting runtime engine is further configured to type check the current instruction according to the type description for the class referenced by the current instruction.

* * * * *

UNITED STATES PATENT AND TRADEMARK OFFICE
CERTIFICATE OF CORRECTION

Page 1 of 1

PATENT NO. : 9,135,035 B2
APPLICATION NO. : 13/896964
DATED : September 15, 2015
INVENTOR(S) : Andres et al.

It is certified that error appears in the above-identified patent and that said Letters Patent is hereby corrected as shown below:

In the specification

Column 2, line 13, delete "Java" and insert -- Java® --, therefor.

Column 16, line 62, delete ".addres." and insert -- .address. --, therefor.

Column 16, line 63, delete "++" and insert -- +"-"+ --, therefor.

In the claims

Column 24, lines 16-17, claim 17, delete "instructions instruction" and insert -- instructions --, therefor.

Signed and Sealed this
Twenty-fourth Day of May, 2016

Michelle K. Lee
*Director of the United States Patent and Trademark Office*